United States Patent Office 2,736,665
Patented Feb. 28, 1956

RE 24 863

2,736,665

METHOD OF STABILIZING SPRAYABLE PAINTS

Edmund Rogers, South Euclid, Ohio, assignor to The Engine Parts Manufacturing Company, Cleveland, Ohio, a corporation of Ohio No Drawing. Application February 17, 1950, Serial No. 144,865

7 Claims. (Cl. 106—190)

This invention relates to an improved method for obviating certain difficulties encountered when it is attempted to spray pigmented lacquers.

The application of paints and lacquers by spray techniques is not new, various methods having been developed whereby a liquid body of the coating composition may by means of pressure expanding through a small orifice causes the mass of the liquid to become finely divided into particles of substantially the same composition as the liquid body and propelled to the surface to be coated. Ordinarily, compressed air has been used as the pressure supplying medium and the carrier to the surface. Other insert gases such as carbon dioxide, nitrogen, and the like have been used in place of the air. The spray pressure has been generated continuously during the spraying operation by mechanical means, or previously introduced into a sealed container. These methods are entirely satisfactory where the coating composition or pigment container therein is not reactive with the pressure supplying medium. However, many pigments have a tendency to "ball up" or agglomerate to form particles which are in many cases too large to pass through the atomizer or spray nozzle thereby clogging the apparatus and rendering it inoperative.

It is therefore, a principle object of this invention to provide a lacquer type coating composition containing a pigment which will ordinarily tend to agglomerate, but in which composition this tendency is absent.

It is a further object of my invention to provide a method for stabilizing lacquer compositions to eliminate for all practical purposes, the tendency of the pigment to agglomerate or settle to irreversible masses. While in the brushing type of paint this may not be a critical problem, it assumes large importance where the paint is to be applied by spray methods.

Other objects of my invention will appear as the description proceeds.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principle of the invention may be employed.

I have found that the fluoro-chloro methanes, particularly difluoro-dichloromethane, trifluoro-chloromethane and mixtures thereof are admirably adapted to the accomplishment of the foregoing objects when encountered in lacquer-type coating compositions.

Broadly stated, therefore, my invention comprises a method for stabilizing pigmented lacquer compositions in which the pigment ordinarily has a tendency to agglomerate or settle to irreversible masses which comprises adding to said lacquer an approximately equal volume of fluoro-chloromethane. More particularly, my invention comprises a method for improving, in the indicated respects, pigmented lacquer compositions in which the pigment ordinarily has a tendency to agglomerate or settle into irreversible masses which comprises adding to said lacquer an approximately equal volume of a mixture of difluoro-dichloromethane and trifluoro-chloromethane.

One class of pigments which is particularly subject to the formation of irreversible masses after incorporation into the vehicle is the metallic pigments. This characteristic appears to be more or less independent of the vehicle, and in the case of metallic pigments and certain other pigmentary materials has necessitated the mixing of the vehicle and pigment immediately before use and in an amount just sufficient to complete the particular job. Such pigments include the so-called "bronzing pigments" which give colors of bronze, gold, silver, copper, etc. Usually these pigments are of the copper-zinc alloy type, the variations in color being achieved by varying the proportions of copper and zinc in the alloy. Aluminum powder is another material in this class. These metallic pigments in particular have a tendency to agglomerate, or settle to irreversible masses.

It has been found that virtually all the solvent type vehicles or lacquer bases may be employed in the compositions of this invention. Among the lacquer bases thus available for use herein are the cellulose derivatives, for example, cellulose nitrate, cellulose acetate, ethyl cellulose, methyl cellulose, cellulose acetobutyrate, etc.; alkyd resins, for example, polybasic acid-polydric alcohol alkyds modified with the glycerides and fatty acids of linseed oil, soyabean oil, tung oil, oiticica oil, coconut oil, castor oil, dehydrated castor oil, cottonseed oil, sunflowerseed oil, safflower oil, etc.; synthetic resins of the polymer type, for example, polyvinyl butyral, polyvinyl acetate, polymethyl methacrylate, polyethyl methracrylate, polymethylacrylate, polybutylacrylate, polyethylacrylate, polystyrene, etc.; and neutral resins, such as the coumarone-indene resins. Resins of low acidity or basicity are a preferred class for my purposes.

In general, these materials are not used alone, but with suitable solvents such as the low boiling aromatic hydrocarbons, e. g., benzene, toluene, xylene, either alone or in combination with another organic solvent such as a low molecular weight alcohol, e. g., methyl alcohol and ethyl alcohol. It is also usual to include in the lacquer formulation plasticizers to improve adherence to the coated surface and to maintain desired film plasticity. Such plasticizers include castor oil, camphor, diethyl phthalate, dibutyl phthalate, tricresyl phosphate, tributyl phosphate, butyl stearate and the like. The solvent system for lacquers is frequently augmented by the presence of additional materials, such as ethyl acetate, butyl acetate, amyl acetate, butyl lactate, cyclohexyl acetate, etc.

Mixtures of various lacquer bases may, of course, be used in accordance with this invention. The compounding of lacquers is well known, and for the purposes of this invention may be used as produced by such available methods.

The fluoro-chloromethanes, which are essential in the methods of my invention, are gases at ordinary pressures, and accordingly, the compositions containing these materials exist only at superatmospheric pressures and thus renders such compositions admirably suited to spray application. Of the three possible fluoro-chloromethanes, difluoro-dichloromethane, trifluoro-chloromethane, and mixtures thereof are most suited for use in accordance with my invention, the monofluoro-trichloromethane being of too high boiling point for use alone where spray application is desired, and too low for use at atmospheric pressure. It may, however, be used as a diluent for either or both of the other members of this class.

The fluoro-chloromethane derivatives of this invention not only serve as propellants for spray application, but when in combination with the lacquer base and the pigment, particularly a metallic pigment, renders the composition stable to the formation of irreversible masses, and obviates the difficulties heretofore experienced with lacquers containing pigments which in that environment tend to "ball up," gell, or settle to irreversible masses. I am not aware of the mechanism by which these several ingredients coact to produce this degree of stability in the lacquers and render the pigmented lacquer useful weeks after it has been compounded upon mere shaking to redisperse the settled pigment. The material is then ready for spray application without any tendency to clog the spray nozzle. Even though the pigment will settle out upon standing, there appears to be no tendency for the individual pigment particles to agglomerate and redisperse as particles of substantially increased size.

It becomes convenient at this point to illustrate several compositions which have been improved in the manner aforesaid by the inclusion of an approximately equal amount by volume of fluoro-chloromethane, such as difluoro-dichloromethane, trifluoro-chloromethane, and mixtures thereof. It is to be understood that these examples are for illustrative purposes only and are not intended to limit the scope of the invention to the precise examples or quantities of ingredients shown therein.

*Example I*

| | |
|---|---|
| Polymethyl methacrylate lacquer (22% solids) | 1 gal. |
| Powdered brass | 1 lb. |
| Difluoro-dichloromethane | 0.5 gal. |
| Trifluoro-chloromethane | 0.5 gal. |

*Example II*

| | |
|---|---|
| Polymethyl acrylate lacquer (20% solids) | 0.75 gal. |
| Powdered brass | 0.5 lb. |
| Difluoro-dichloromethane | 0.4 gal. |
| Trifluoro-chloromethane | 0.6 gal. |

*Example III*

| | |
|---|---|
| Polyethyl methacrylate lacquer (24% solids) | 1 gal. |
| Powdered brass | 0.75 lb. |
| Difluoro-dichloromethane | 0.5 gal. |
| Trifluoro-chloromethane | 0.5 gal. |

*Example IV*

| | |
|---|---|
| Polybutyl acrylate lacquer (27% solids) | 1.5 gal. |
| Powdered brass | 1 lb. |
| Difluoro-dichloromethane | 0.5 gal. |
| Trifluoro-chloromethane | 0.5 gal. |

*Example V*

| | |
|---|---|
| Polymethyl methacrylate lacquer (20% solids) | 1 gal. |
| Powdered brass | 1.5 lb. |
| Difluoro-dichloromethane | 0.6 gal. |
| Trifluoro-chloromethane | 0.5 gal. |

*Example VI*

| | |
|---|---|
| Polymethyl methacrylate lacquer (20% solids) | 1 gal. |
| Powdered "silver" (copper-zinc alloy) | 1 lb. |
| Difluoro-dichloromethane | 0.5 gal. |
| Trifluoro-chloromethane | 0.5 gal. |

*Example VII*

| | |
|---|---|
| Coumarone-resin lacquer (30% solids) | 1 gal. |
| Powdered aluminum | 1 lb. |
| Difluoro-dichloromethane | 0.75 gal. |
| Trifluoro-chloromethane | 0.75 gal. |

*Example VIII*

| | |
|---|---|
| Nitrocellulose lacquer (12.2% solids) | 1 gal. |
| Powdered "gold" (copper-zinc alloy) | 1 lb. |
| Difluoro-dichloromethane | 0.5 gal. |
| Trifluoro-chloromethane | 0.5 gal. |

*Example IX*

| | |
|---|---|
| Cellulose acetate lacquer (15% solids) | 1 gal. |
| Powered brass | 1 lb. |
| Difluoro-dichloromethane | 0.5 gal. |
| Trifluoro-chloromethane | 0.5 gal. |

The pigments useful herein are preferably metallic, and finely divided, that is, such pigmentary materials should be 200 to 400 mesh size, preferably finer than 325 mesh. The amount employed in these compositions ranges from 0.5 to 1.5 pounds per gallon of lacquer base, a ratio of one pound per gallon being most satisfactory for good coverage. Most of the resins indicated above may be purchased in the form of clear lacquers containing from 8% to 50% or more solids. While it is generally unnecessary to further alter the commercial lacquers prior to use in the compositions of this invention, where the clear lacquer is too viscous, it may be found desirable to further dilute with methyl or ethyl alcohol. Ordinarily, however, the solvent power of the fluoro-chloromethane component will adjust the viscosity to that which is proper for spray application.

The fluoro-chloromethanes mentioned in the previous examples are commercially available under the trade names, Freon 12 ($CCl_2F_2$) and Freon 11 ($CClF_3$). A 50–50 mixture of these two Freons yields pressures at ordinary temperatures ranging from about 27 to 30 p. s. i.; a 60–40 mixture of Freon 11 and Freon 12, respectively, gives pressures of about 40 p. s. i. I prefer to use mixtures of these materials which will yield pressures less than about 40 pounds, and preferably in the range of pressures provided by a 50–50 mixture of Freons 11 and 12. While I prefer to use the fluoro-chloromethanes in substantially equal amount by volume with the lacquer, amounts ranging from 35% to 75% of the final volume may be used.

In actual practice, the improvements in stability or shelf-life of the coating compositions of this invention are obtained by selecting a container fitted to receive a valved outlet and filling it about half full with a clear lacquer of the types indicated above. This lacquer may be thinned with alcohol or xylol if desired. Thereafter, the proper amount of finely divided pigment, such as powdered brass, is weighed into the container. The container is then cooled to a temperature below the boiling point of the Freon or Freon mixture by suitable means. At this reduced temperature, usually about 0° F., the container is filled to the top with liquid Freon and sealed with the valve and valve collar assembly. The entire operation from the addition of Freon should be done in as short a period as possible to avoid loss of Freon.

Other modes of applying the principle of my invention may be employed, change being made as regards the details described, provided the features stated in any of the following claims or the equivalent of such be employed.

I therefore particularly point out and distinctly claim as my invention:

1. A method for stabilizing pigmented lacquer compositions in which the pigment ordinarily has a tendency to agglomerate or settle to irreversible masses, which comprises adding to said lacquer an approximately equal volume of a fluoro-chloromethane.

2. A method for stabilizing lacquer compositions in which the pigment is a finely dvided metal pigment, which comprises adding to said lacquer an approximately equal volume of a fluoro-chloromethane.

3. A method for stabilizing lacquer compositions in which the pigment is a finely divided copper-zinc alloy pigment, which comprises adding to said lacquer an approximately equal volume of a fluoro-chloromethane.

4. A method for stabilizing lacquer compositions in which the pigment is a finely divided metal pigment, which comprises adding to said lacquer an approximately equal volume of fluoro-chloromethane selected from the group consisting of difluoro-dichloromethane, trifluoro-chloromethane, and mixtures thereof.

5. A method for stabilizing lacquer compositions in which the pigment is a finely divided copper-zinc alloy pigment, which comprises adding to said lacquer an approximately equal volume of fluoro-chloromethane selected from the group consisting of difluoro-dichloromethane, trifluoro-chloromethane, and mixtures thereof.

6. A method for stabilizing bronzing lacquer compositions containing a bronzing pigment of finely divided copper-zinc alloy in an amount equivalent to about 0.5 to 1.5 pounds of pigment per gallon of clear lacquer, which comprises adding to said lacquer an approximately equal volume of fluoro-chloromethane selected from the group consisting of dichloro-difluoromethane, trifluoro-chloromethane, and mixture thereof at a reduced temperature, and sealing the valved container.

7. A method for stabilizing bronzing lacquer compositions containing a bronzing pigment of finely divided copper-zinc alloy in an amount equivalent to about 0.5 to 1.5 pounds of pigment per gallon of clear lacquer, which comprises adding to said lacquer from 35% to 75% based on a total volume of lacquer plus fluoro-chloromethane of a fluoro-chloromethane selected from the group consisting of difluoro-dichloromethane, trifluoro-chloromethane, and mixtures thereof, at a temperature of about 0° F. and sealing the valved container.

References Cited in the file of this patent

UNITED STATES PATENTS

| | | |
|---|---|---|
| 2,047,598 | Salzberg | July 14, 1936 |
| 2,140,347 | Bley | Dec. 13, 1938 |
| 2,321,023 | Goodhue | June 8, 1943 |
| 2,345,955 | Wampuer | Apr. 4, 1944 |
| 2,358,986 | McGovran | Sept. 26, 1944 |
| 2,390,217 | Krieger | Dec. 4, 1945 |
| 2,440,915 | Roehr | May 4, 1948 |

FOREIGN PATENTS

| | | |
|---|---|---|
| 622,759 | Great Britain | May 6, 1949 |